(12) United States Patent  (10) Patent No.: US 7,652,778 B2
Sevier  (45) Date of Patent: Jan. 26, 2010

(54) OBTAINING A DIGITAL IMAGE OF A PHYSICAL OBJECT

(75) Inventor: Richard G. Sevier, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 10/700,215

(22) Filed: Nov. 3, 2003

(65) Prior Publication Data

US 2005/0094228 A1 May 5, 2005

(51) Int. Cl.
  *G06F 15/00* (2006.01)
  *G06F 3/12* (2006.01)
  *G06K 1/00* (2006.01)
(52) U.S. Cl. .................................. 358/1.13; 358/1.15
(58) Field of Classification Search .................. 358/498, 358/374, 464, 1.19, 3.24; 399/374, 364
  See application file for complete search history.

(56) References Cited

U.S. PATENT DOCUMENTS

| 4,839,740 A | * | 6/1989 | Yoshida | 358/498 |
| 5,796,496 A | * | 8/1998 | Ono | 358/498 |
| 6,169,873 B1 | * | 1/2001 | Connolly | 399/365 |
| 2003/0048470 A1 | * | 3/2003 | Garcia | 358/1.15 |
| 2004/0145770 A1 | * | 7/2004 | Nakano et al. | 358/1.15 |
| 2005/0200903 A1 | * | 9/2005 | Okubo | 358/3.24 |

FOREIGN PATENT DOCUMENTS

JP 05-048835 * 2/1993

* cited by examiner

*Primary Examiner*—Douglas Q Tran
(74) *Attorney, Agent, or Firm*—Jack H. McKinney (57) ABSTRACT

Selecting a digital image. A method embodiment includes obtaining a first digital image of the first side of a physical object and obtaining a second digital image of a second side of the physical object. The first digital image is examined to determine if it is substantially blank. If the first digital image is determined to be blank, the second digital image is sent for processing. Otherwise, the first digital image is sent for processing.

15 Claims, 5 Drawing Sheets

OBTAINING A DIGITAL IMAGE OF A PHYSICAL OBJECT

BACKGROUND

Copiers, fax machines, digital senders, and scanners are often equipped with automatic document feeders (ADFs). Placing a multi-page original document in an ADF allows a user to issue a single common copy, fax, send, or scan, as the case may be, causing the particular device in question to sequentially process each page of the original document. So that the pages are processed in the correct order, the user is required to place the document in the ADF in either a face-up or face-down orientation.

Incorrectly placing a document in an ADF—that is placing the document face-up when it should be face-down or placing the document face-down when it should be face-up—results in (1) the device processing the pages in a reverse order and/or (2) the device processing the wrong side of each page. This can not only waste time and paper—it often results in user frustration.

Imagine incorrectly placing a twenty-five page single-sided document in the ADF of a fax machine. One side of each page contains text or other information, while the other side is blank. Once the sender enters a destination number and issues a fax command, the blank side of each page is processed and transmitted. The recipient receives a twenty-five page blank document, and the sender will often not recognize the mistake.

DETAILED DESCRIPTION

INTRODUCTION: It is not uncommon for a user to incorrectly place a document in the automatic document feeder (ADF) of a device such as a copier, facsimile device, or scanner. The incorrect placement can cause the device in question to produce a blank copy, a blank fax transmission, and/or a blank scan image. Embodiments of the present invention will operate to detect when a document has been incorrectly placed in an ADF and compensate for the error.

The term digital image is used throughout the following description. A digital image is an electronic grid of pixels selected and arranged to reveal any combination of text and/or graphics. A digital image can be generated by scanning a physical object such as a sheet of paper, a photograph, or a business card. An ordered set of digital images, for example, can be generated by sequentially scanning a set of physical objects. The resulting set of digital images then contains a digital image of each object scanned. A digital image can be one of or incorporated within any number of formats. Format examples include bitmap, PDL (page description format), PDF (Portable Document Format), TIFF (Tagged Image File Format), and JPEG (Joint Photographic Experts Group).

The description that follows is broken into sections. The first section, labeled "components" describes exemplary logical and physical elements used to implement various embodiments of the present invention. The next section, labeled "operation," describes exemplary steps taken to practice various embodiments of the present invention.

Figure 1:
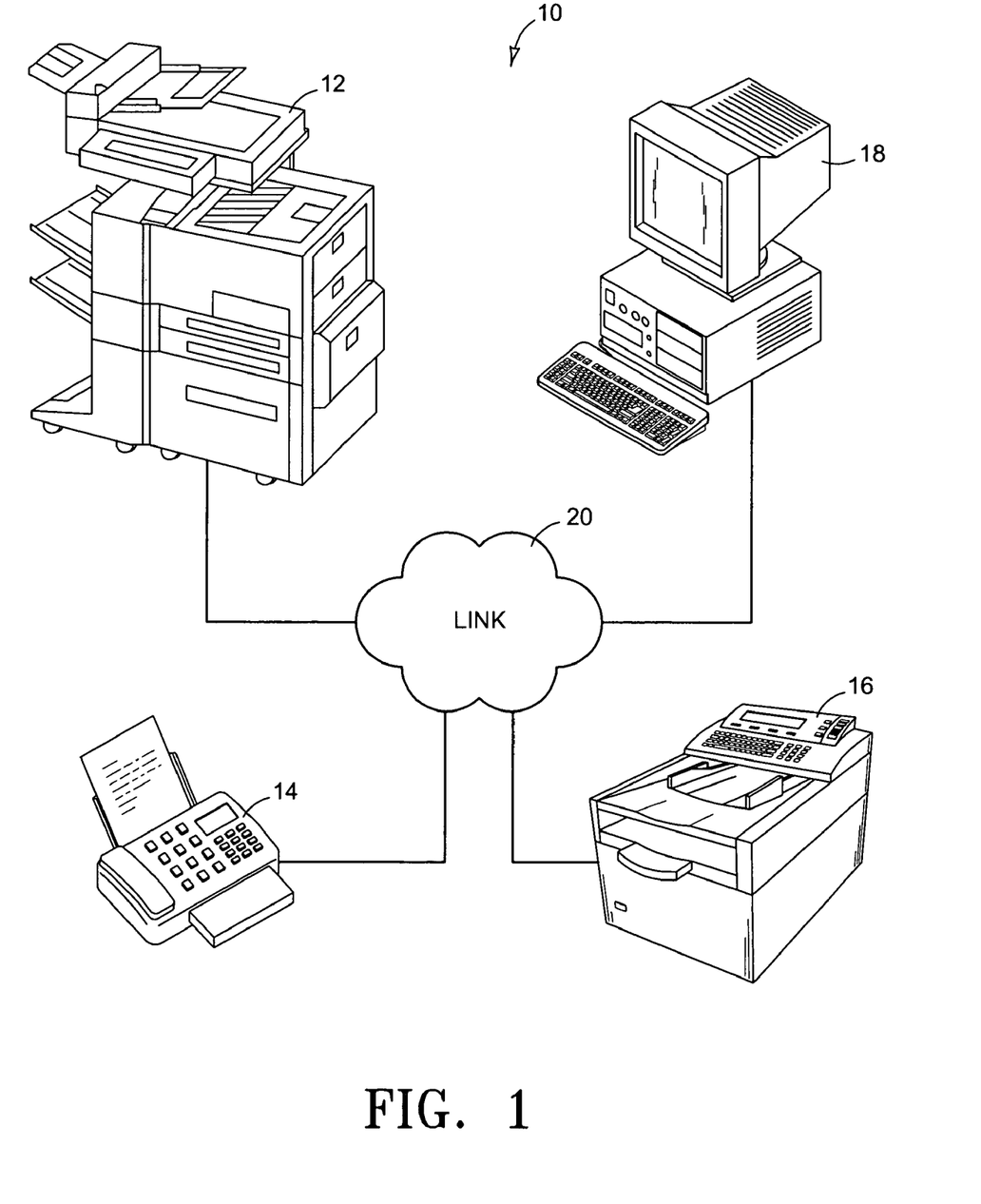
FIG. 1 illustrates an exemplary computing environment in which embodiments of the present invention can be implemented.

COMPONENTS: FIG. 1 illustrates an exemplary computing environment 10 in which various embodiments of the present invention may be implemented. Environment 10 includes, multi function peripheral (MFP) 12, facsimile device 14, digital sender 16, and computer 18. MFP 12 represents generally any device capable of functioning as a scanner, as a copier, and as a printer. As a scanner, MFP 12 is capable of generating a digital image from one or more physical objects that are placed on its platen. As a copier, MFP is capable of scanning an object placed on its platen and producing a printed representation or copy of that object. As a printer, MFP 12 is capable of producing a printed version of a digital image. MFP 12 may serve other functions as well.

Facsimile device 14 represents generally any device capable of scanning and transmitting a facsimile of a document over a telephone connection. Digital sender 16 represents generally any device capable of scanning and transmitting a digitized version of a document as part of an electronic mail message. Computer 18 represents generally any computing device capable of interacting with MFP 12. For example, computer 18 may be a desktop computer, a laptop computer, a PDA (Personal Digital Assistant) or any other device capable of communicating with MFP 12.

Link 20 represents generally a cable, wireless, or remote connection via a telecommunication link, an infrared link, a radio frequency link, or any other connector or system of connectors that provides electronic communication between MFP 12, printer 14, scanner 16, and computer 18. Link 20 may include an intranet, the Internet, or a combination of both. Each portion of link 20 connecting a given component 12-18 may or may not be distinct from the other components of link 20. For example link 20 may connect MFP 12 to computer 16. It may connect digital sender 16 to the Internet. It may connect facsimile device 14 to a telephone network.

Figure 2:
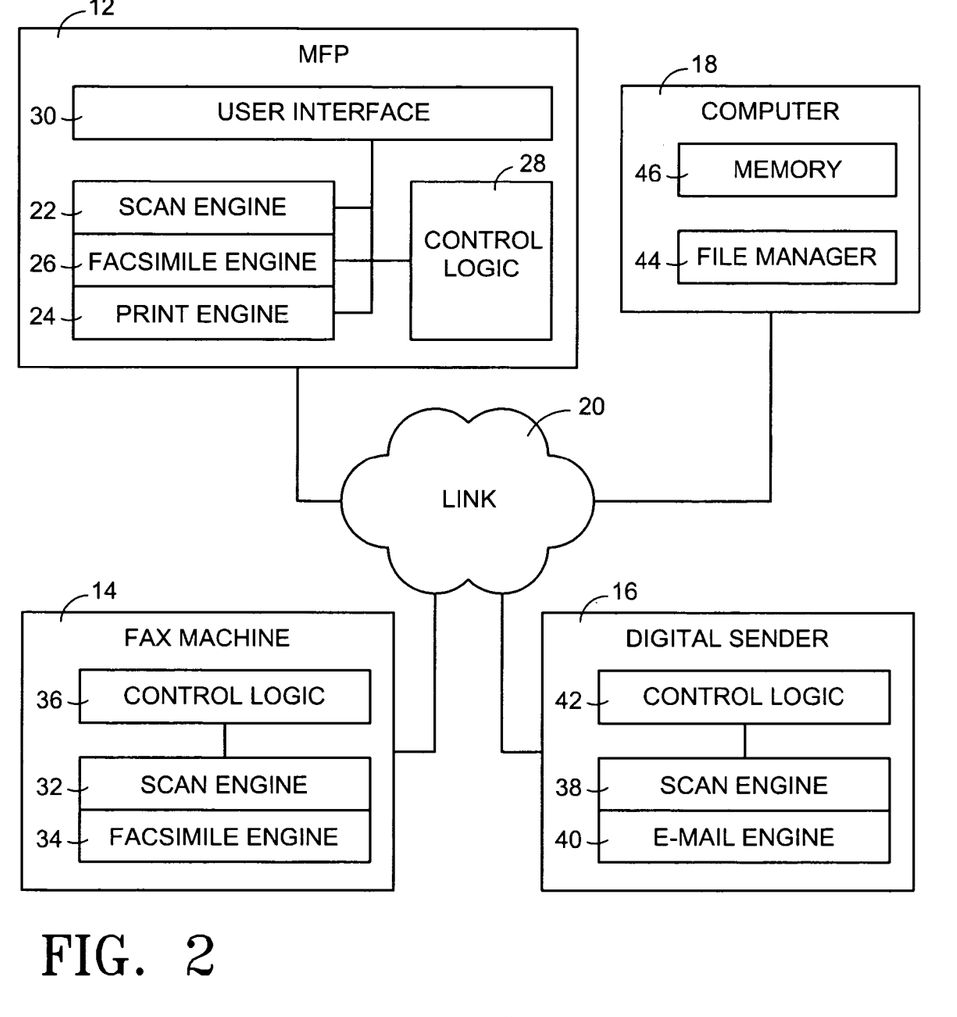
FIG. 2 is a block diagram showing physical and logical components of the devices shown in FIG. 1.

FIG. 2 is an exemplary block diagram showing the physical and logical components of MFP 12, facsimile device 14, digital sender 16, and computer 18 of FIG. 1. MFP 12 includes scan engine 22, print engine 24, facsimile engine 26, control logic 28, and user interface 30. Scan engine 22 represents the circuitry and other physical components that enable MFP 12 to form a set of digital images from an original document. Print engine 24 represents the circuitry and other physical components that enable MFP 12 to print a set of digital images. Facsimile engine 26 represents the circuitry and other physical components that enable MFP 12 to transmit a set of digital images as part of a facsimile message.

Control logic 28 represents one or more programs responsible for controlling and coordinating the operations engines 22-26. For example, control logic 28 is responsible for directing scan engine 22 to initiate a scan of a document placed in the MFP's ADF or on the MFP's platen. Control logic 28 can then direct print engine 24 to print the digital images generated from the scan an/or direct facsimile engine 26 to send a facsimile message containing the digital images. User interface 30 represents generally any circuitry and other physical components enabling a user to interact with control logic 28. For example, user interface 30 may include a touch screen and/or buttons.

Facsimile device 14 includes scan engine 32, facsimile engine 34, and control logic 36. Scan engine 32 represents the circuitry and other physical components that allow facsimile device 14 to form a set of digital images from an original document. Facsimile engine 34 represents the circuitry and other physical components that enable facsimile device 14 to transmit a set of digital image as part of a facsimile message. Control logic 36 represents one or more programs capable of controlling and coordinating the operation of scan engine 32 and facsimile engine 34. For example, control logic 36 directs scan engine 32 to process each page of a document placed in the facsimile device's ADF (not shown). Control logic 36, then, using data from scan engine 32, generates a set of digital images each representing a page of the document. Finally, control logic 36 directs facsimile engine 34 to transmit a facsimile message containing the set of digital images.

Digital sender 16 includes scan engine 38, e-mail engine 40, and control logic 42. Scan engine 38 represents the circuitry and other physical components that allow digital sender 16 to form a set of digital images from an original document. E-mail engine 40 represents any combination of hardware and/or programming for generating and transmitting an electronic mail message containing a set of digital images. The set of digital images may, for example, be included in or attached to an electronic mail message. Control logic 42 represents one or more programs capable of controlling and coordinating the operation of scan engine 38 and e-mail engine 40. For example, control logic 42 directs scan engine 38 to process each page of a document placed in the digital sender's ADF (not shown). Control logic 42, then, using data from scan engine 38, generates a set of digital images each representing a page of the document. Finally, control logic 42 directs e-mail engine 40 to transmit an electronic mail message containing the set of digital images.

Computer 18 includes file manager 44 and memory 46. file manager 44 represents any program capable of archiving digital images in memory 46. Memory represents generally any memory in which digital images can be archived.

In computing environment 10 of FIG. 1, MFP 12, facsimile device 14, and digital sender 16 are each capable of scanning a physical object to produce a digital image. Each scan engine 22, 32, and 38 includes an ADF that allows the engine to sequentially process each page of a document to form a digital image of that page. It is assumed that each device 12-16 is able to scan both sides of a page. This can be accomplished using a duplexer or a dual scan system. Examples of ADF's and a dual scan system are described below with reference to FIGS. 4 and 5.

Figure 3:
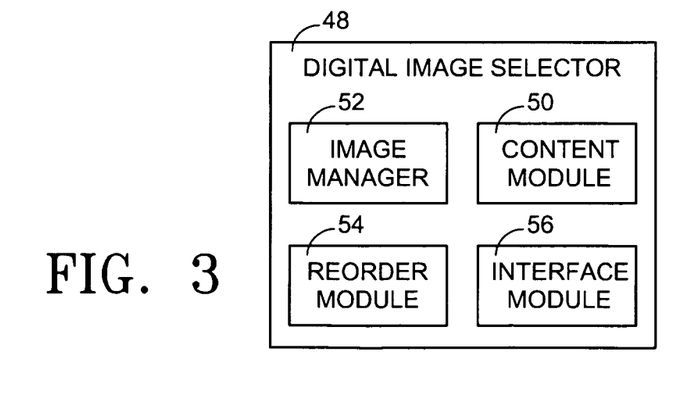
FIG. 3 is a block diagram showing a digital image selector and its modules according to an embodiment of the present invention.

FIG. 3 is a block diagram illustrating digital image selector 48 that is responsible for selecting a digital image. With reference back to FIG. 2, digital image selector 48 may be found on MFP 12, facsimile device 14, digital sender 16, and/or computer 18. Digital image selector 48 may be an integral part of control logic 28 of MFP 12, control logic 36 of facsimile device 14, and/or control logic 42 of digital sender 16. Digital image selector 48 may be an integral part of file manager 44 or it may be a stand alone program running on computer 18.

Digital image selector 48 includes content module 50, image manager 52, reorder module 54, and interface module 56. Content module 50 represents generally any program capable of examining a digital image or a set of digital mages to determine if the image or images are substantially blank. A typical digital image is made up of background pixels and content pixels. However, a digital image may be entirely made up of background or content pixels. Content pixels are the pixels of a digital image used to convey information when the digital image is rendered. For example, a group of content pixels may be arranged to reveal a letter, number, or other character. Other content pixels may be arranged to reveal vector or halftone graphics. Background pixels are the other pixels of a digital image. Background pixels are often uniform. For example, a digital image of a page of a text document is made up mostly of "white" or "transparent" background pixels. When rendered, the content or text pixels are visually distinct from the background pixels.

A digital image that only contains background pixels is substantially blank. Content module 50 operates by examining a digital image to determine if it contains any content pixels. Using a grey scale digital image as an example, each pixel can be represented by an intensity level ranging from zero (for white) to two hundred fifty-five (for black). A digital image containing pixels having a non-uniform uniform intensity levels can be assumed to contain content pixels. Imagine, for example, scanning a page of black text printed on white paper. The resulting digital image would contain mostly white pixels but also a substantial number of black pixels. Content module 50 identifies the non-uniformity and determines that the digital image is not blank.

On the other hand, a digital image consisting only of pixels of substantially uniform intensity levels can be assumed to contain only background pixels. Imagine, for example, scanning a blank piece of paper. No matter the color of the paper, the resulting digital image would consist only of pixels of a uniform intensity levels. Content module 50 identifies the uniformity and determines that the digital image is substantially blank.

Image manager 52 represents generally any program capable of obtaining a first digital image of a first side of a physical object and a second digital image of a second side of the physical object so that those digital images can be examined by content module 50. Image manager 52 is also responsible for sending the second digital image for processing if the first digital image is substantially blank and for sending the first digital image for processing if the first digital image is not substantially blank. Image manager 52 may also be capable of obtaining a first set of digital images and a second set of digital images. Each digital image of the first set is a digital image of a fist side of a physical object. Each digital image of the second set is a digital image of a second side of a physical object.

A digital image can be obtained in any number of ways. For example, a surface of a physical object such as a side of a sheet of paper can be scanned to obtain a first digital image. The opposing side can be scanned to obtain a second digital image. A set of digital images can be obtained by sequentially scanning an ordered set of pages. A first set can be obtained by scanning the first side of each of the pages. A second set can be obtained by scanning the second side of each of the pages. Sending a digital image for processing can also be accomplished in a number of manners. For example, a digital image can be sent to a print engine to be printed, to a facsimile engine to be included in a facsimile message, to an e-mail engine to be included in an electronic mail message, and/or to a file manager to be archived.

Reorder module 54 represents generally any program capable of reversing the order of a set of digital images. For example, the pages of a document may have been scanned in reverse order creating a set of digital images that share the same reverse order. Reorder module 54 can adjust the set of digital images so that they are correctly arranged.

Interface module 56 represents any program capable of directing external instructions to the other components 50-54 of digital image selector 48. Referring back to FIG. 2, digital image selector 48 may be a feature of MFP 12 that, for example, can be turned on or off. A user enters desired instructions through user interface 30 which are then sent to interface module 56 which in turn directs the other modules 50-54 accordingly. Interface module 56 may also be responsible for reporting on activities performed by the other modules 50-54. Interface module 56, for example, may report to user interface 30 that a set of digital images has been reordered or it may request permission to reorder the set.

Figure 4:
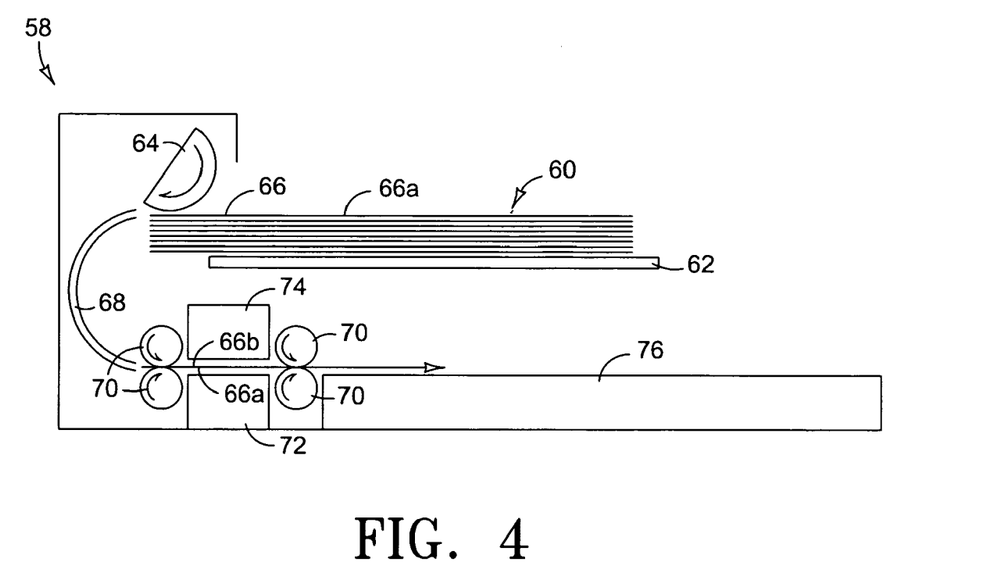
FIG. 4 is an exemplary side view of a dual scan system with a top feed document feeder.
Figure 5:
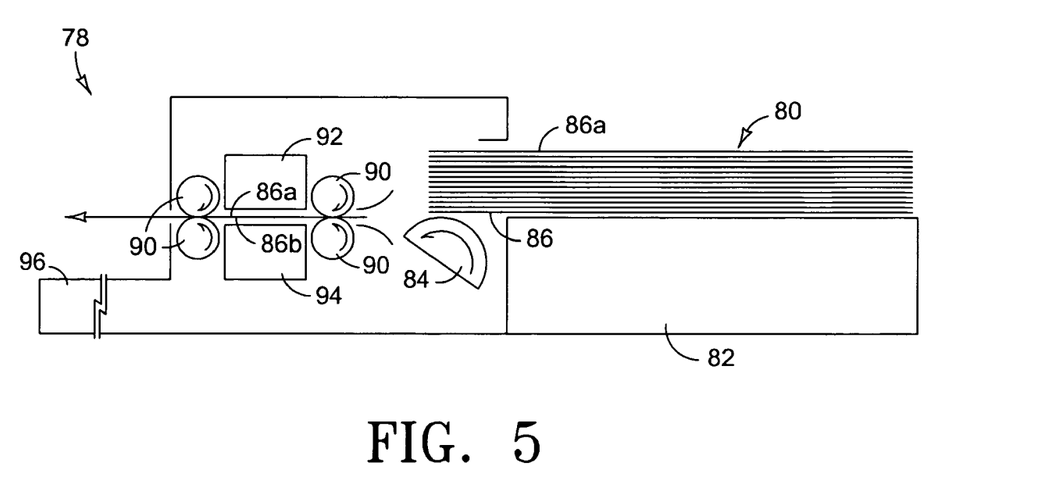
FIG. 5 is an exemplary side view of a dual scan system with a bottom feed document feeder.

FIGS. 4 and 5 each illustrate a different scan engine that can be used when generating sets of digital images. FIG. 4 shows a dual scan, scan engine 58 with a top feed automatic document feeder (ADF). An ordered stack of media sheets 60 is assembled face-up on input tray 62. Pick roller 64 rotates urging top sheet 66 into and through transport path 68. Drive rollers 70 then grab and continue urging top sheet 66 past first side scanner 72 and second side scanner 74 until top sheet 66 rests in output bin 76. The process repeats for each top sheet 66 until stack 60 is depleted.

As a top sheet 66 passes scanners 72 and 74, first side scanner 72 generates a digital image of a first side 66a of the sheet 66, while second side scanner 74 generates a digital image of a second side 66b of sheet 66. Alternatively, scan engine 58 may instead include first side scanner 72 and a duplexer (not shown). After the first side 66a of top sheet 66 passes over first side scanner 72, the duplexer would flip sheet 66 allowing the opposing second side 66b of sheet 66 to pass over top side scanner 72.

Two sets of digital images are created as stack 60 is depleted. The first set includes all the digital images generated by first side scanner 72. The second set includes all the digital images generated by second side scanner 74. Or, if a duplexer is present, the second set includes all the digital images generated by first side scanner after a given sheet has been flipped by the duplexer. Imagine that stack 60 is a document made up of a set of single sided sheets. Also imagine that stack 60 was correctly placed face-up on input tray 62. The resulting first set of digital images will not be blank while the second set will. Moreover, the digital images in the first set will be arranged as expected.

Now instead, imagine that stack 60 was mistakenly placed face-down on input tray 62. The resulting first set of digital images will be blank while the second set will not. The digital images in the second set will be incorrectly ordered because the sheets of stack 60 were scanned in reverse order—last to first. This is where reorder module 54 comes into play. Content module 52 examines the first and second sets of digital images obtained after scanning each sheet in stack 60. The examination reveals that the first set is substantially blank while the second set is not. This means that stack 60 was placed face-down instead of face-up. With this information, reorder module 56 can assume that it is proper to reverse the order in which the digital images are arranged in the second set. Alternatively, interface module 52 may request user approval before reorder module 56 is allowed to continue.

FIG. 5 shows a dual scan, scan engine 78 with a top feed automatic document feeder (ADF) 78. An ordered stack of media sheets 80 is assembled face-up on input tray 82. Pick roller 84 rotates urging bottom sheet 86 into the grip of transport rollers 90. Transport rollers 90 urge bottom sheet 86 past first side scanner 92 and second side scanner 94 until bottom sheet 86 rests in output bin 96. As a bottom sheet 86 passes scanners 92 and 94, first side scanner 92 generates a digital image of a first side 86a of the sheet 86, while second side scanner 94 generates a digital image of a second side 86b of sheet 86. The process repeats for each bottom sheet 86 until stack 80 is depleted.

Imagine that stack 80 is a document made up of a set of single sided sheets correctly placed face-up on input tray 82. The resulting first set of digital images generated by first side scanner 92 will not be blank while the second set generated by second side scanner 94 will be blank. Moreover, the digital images in the first set will be ordered as expected.

Now instead, imagine that stack 80 was mistakenly placed face-down on input tray 82. The resulting first set of digital images will be blank while the second set will not. The digital images in the second set will be incorrectly ordered because the sheets of stack 80 were scanned in reverse order—first to last. Again, this is where reorder module 54 comes into play. Content module 50 examines the first and second sets of digital images obtained after scanning each sheet in stack 80. The examination reveals that the first set is substantially blank while the second set is not. This means that stack 80 was placed face-down instead of face-up. With this information, reorder module 54 can assume that it is proper to reverse the order in which the digital images are arranged in the second set. Alternatively, interface module 56 may request user approval before reorder module 54 is allowed to continue.

Figure 6:
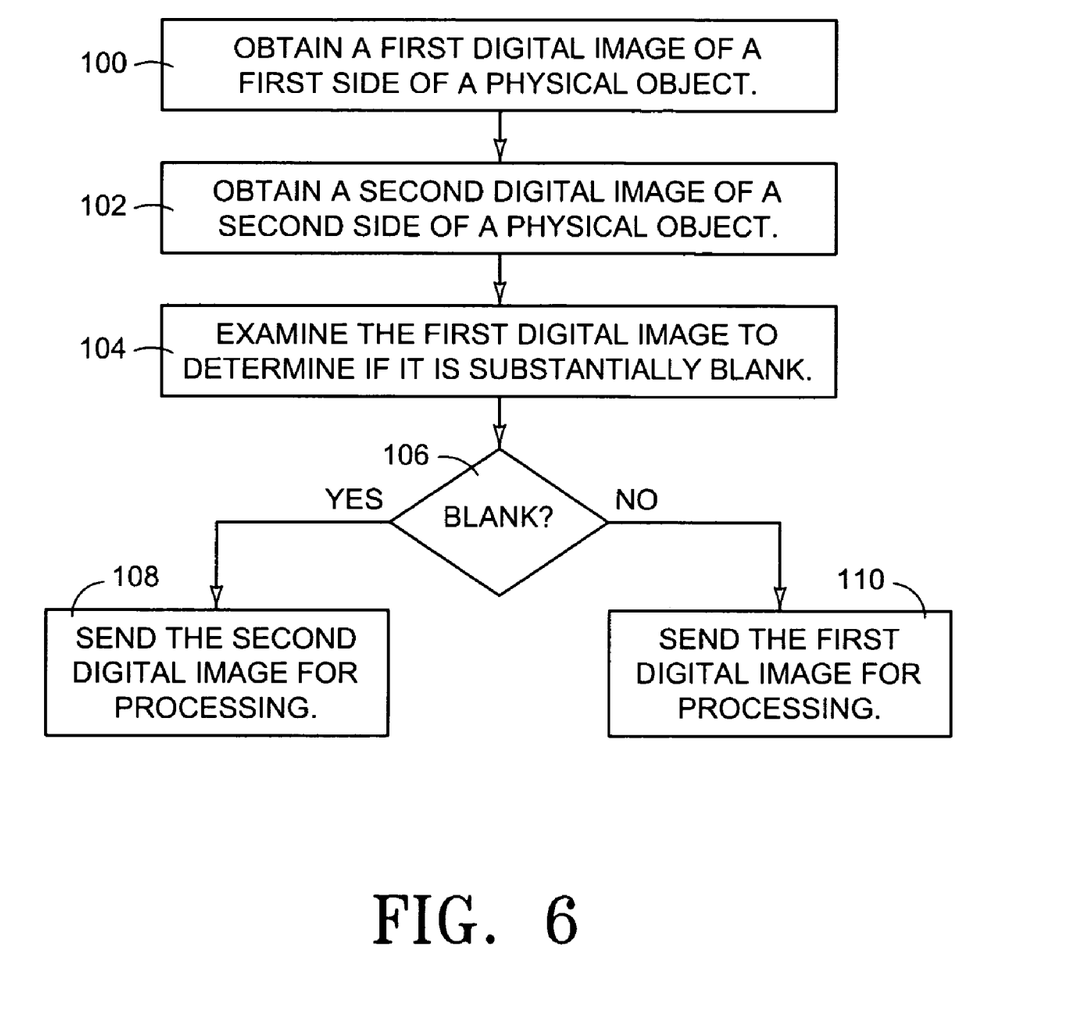
FIG. 6 is an exemplary flow diagram illustrating steps taken to select a digital image according to an embodiment of the present invention.
Figure 7:
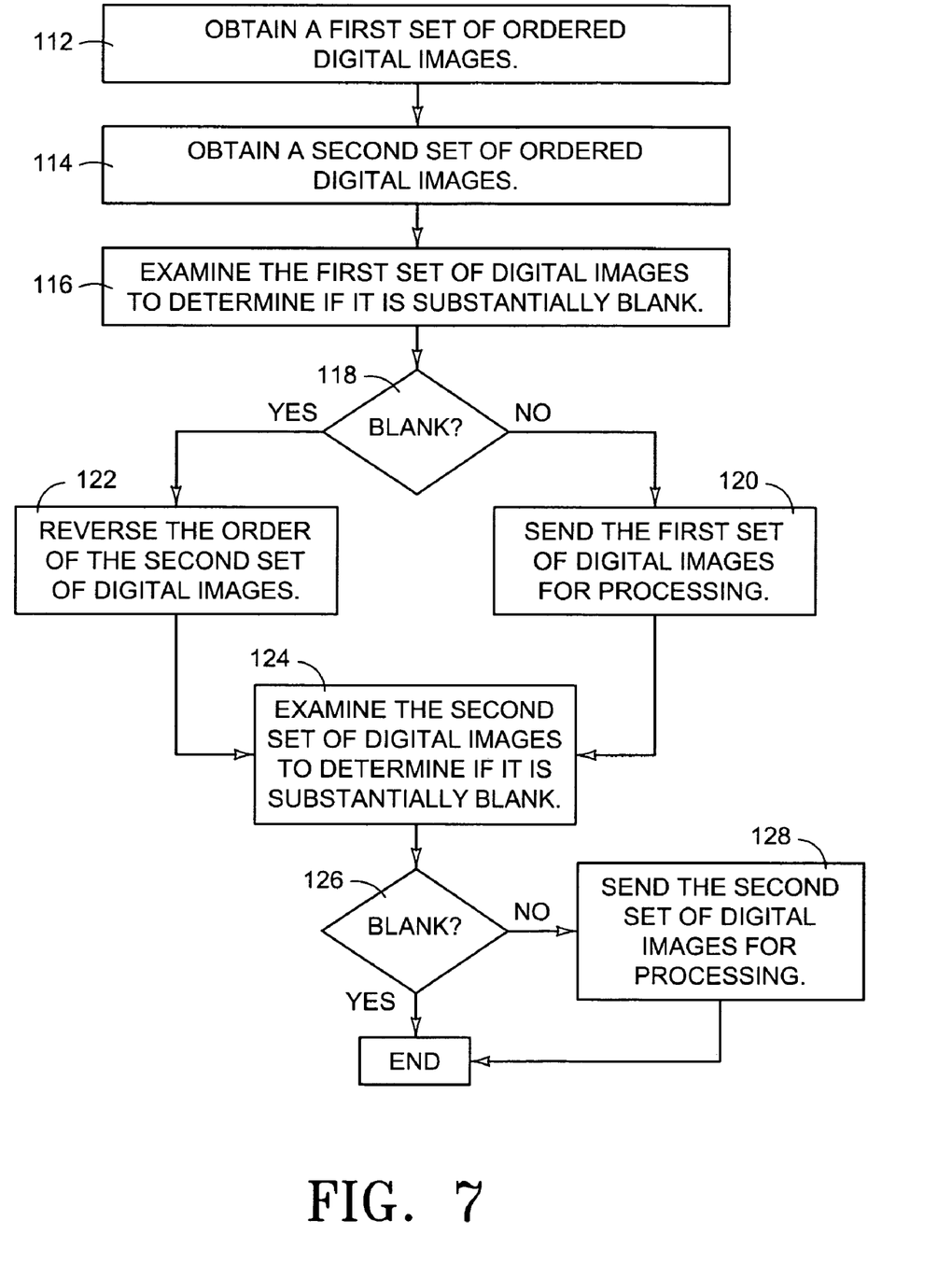
FIG. 7 is an exemplary flow diagram illustrating steps taken to select a set of digital images according to an embodiment of the present invention.

OPERATION: The operation of embodiments of the present invention will now be described with reference to FIGS. 6-7. FIGS. 6-7 are exemplary flow diagrams that help illustrate steps taken to select a digital image or set of digital images according to embodiments of the present invention.

Starting with FIG. 6, a first digital image of a first side of a physical object is obtained (step 100). A second digital image of a second side of a physical object is obtained (step 102). The first digital image is examined to determine if it is substantially blank (steps 104 and 106). If the first digital image is substantially blank, the second digital image is sent for processing (step 108), where, for example, it may be printed, included in a facsimile message, included in an electronic mail message, and/or archived. If the fist digital image is not blank, it is sent for processing (step 110).

Steps 100 and 102 can, for example, be accomplished by scanning opposing sides of a sheet of paper. Steps 104 and 106 can be accomplished by content module 50 (FIG. 3) while steps 108 and 110 can be performed by image manager 52 (FIG. 3). It is noted that step 102 may be performed immediately before step 108 and then only after it is determined in step 106 that the first digital image is substantially blank. In this way, the second digital image is obtained only if the first digital image is substantially blank. Also the second digital image may be sent for processing in step 108 only after it is examined and determined not to be substantially blank.

Upon determining that the first digital image is blank in step 106, the second digital image may not be automatically sent for processing. Instead, a user may be alerted in some fashion that the first digital image is blank and prompted to instruct whether the second digital image should be sent. With reference back to FIG. 3, digital image selector 48 may be user configurable. For example, a user may indicate that digital image selector 48 is to assume that if a digital image of one side of a physical object is blank then the digital image of the other side is to be sent for processing. Instead a user may indicate that digital image selector 48 is to prompt the user before making any such determination.

The physical object may be a first of an ordered set of physical objects. In such case, if it is determined in steps 104 and 106 that the first digital image is not substantially blank, a first set of digital images can be obtained and sent for processing by image manager 52. Each digital image of the first set is a digital image of a first side of a physical object of the ordered set of physical objects. If it is determined in steps 104 and 106 that the first digital image is substantially blank, a second set of digital images can be obtained and sent for processing by image manager 52. Each digital image of the second set is a digital image of a second side of a physical object of the ordered set of physical objects.

FIG. 7 illustrates steps taken to select a set of digital images. A first set of ordered digital images is obtained (step 112). A second set of ordered digital images is obtained (step 114). The first set of digital images is examined to determine if it is substantially blank (steps 116 and 118). If the first set is not substantially blank, it is sent for processing (step 120). Otherwise, the order in which the second set of digital images is arranged is reversed (step 122). The second set of digital images is examined to determine if it is substantially blank (steps 124 and 126). If blank, the process ends. If not blank, the second set of digital images is sent for processing (step 128).

Steps 112 can, for example, be accomplished by scanning the first side of each sheet in a stack of sheets. Similarly, step 114 can be accomplished by scanning the second side of each of the same stack of sheets. Steps 116, 118, 124, and 126 can be accomplished by content module 50 (FIG. 3) while steps 120 and 128 can be accomplished by image manager 52 (FIG. 3). Step 122 can be performed by reorder module 54.

CONCLUSION: The diagrams of FIGS. 2-5 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. More specific examples of suitable computer-readable media include, but are not limited to, a portable magnetic computer diskette such as floppy diskette or hard drives, a random access memory (RAM), a read-only memory (ROM), an erasable programmable read-only memory, or a portable compact disc.

Although the flow diagrams of FIGS. 6 and 7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A digital image selection method, comprising:
   causing a scan engine to initiate a scan of an ordered set of physical objects;
   obtaining a first digital image of a first side of a physical object, the physical object being a first of the ordered set of physical objects scanned by the scan engine;
   examining the first digital image to determine if it is substantially blank;
   if the first digital image is not substantially blank, obtaining a first set of digital images, each digital image of the first set being a digital image of a first side of a physical object of the ordered set of physical objects scanned by the scan engine, and sending the first set of digital images for processing by one of a print engine, a facsimile engine, an e-mail engine, and a file manager;
   only if the first digital image is substantially blank, obtaining a second digital image of a second side of the physical object, the physical object being the first of the ordered set of physical objects scanned by the scan engine and examining the second digital image to determine if it is substantially blank;
   if the first digital image is substantially blank and the second image is not substantially blank, obtaining a second set of digital images, each digital image of the second set being a digital image of a second side of a physical object of the ordered set of physical objects scanned by the scan engine, and sending the second set of digital images for processing by one of the print engine, the facsimile engine, the e-mail engine, and the file manager.

2. The method of claim 1, further comprising discarding the first digital image if it is substantially blank.

3. The method of claim 1, wherein the steps of obtaining the first and second sets of digital images comprise:
   causing the scan engine to scan the first side of each physical object in the ordered set to generate the first set of digital images; and
   causing the scan engine to scan the second side of each physical object in the ordered set to generate the second set of digital images.

4. The method of claim 1, wherein:
   sending the second set of digital images for processing comprises sending the second set of digital images to be printed if the first digital image is substantially blank; and
   sending the first set of digital images for processing comprises sending the first set of digital images to be printed if the first digital image is not substantially blank.

5. The method of claim 1, wherein:
   sending the second set of digital images for processing comprises sending the second set of digital images to be incorporated in a facsimile transmission if the first digital image is substantially blank; and
   sending the first set of digital images for processing comprises sending the first set of digital images to be incorporated in a facsimile transmission if the first digital image is not substantially blank.

6. The method of claim 1, wherein:
   sending the second set of digital images for processing comprises sending the second set of digital images to be incorporated in an electronic mail message if the first digital image is substantially blank; and
   sending the first set of digital images for processing comprises sending the first set of digital images to be incorporated in an electronic mail message if the first digital image is not substantially blank.

7. The method of claim 1, wherein:
sending the set of digital images image for processing comprises sending the second set of digital images to be archived if the first digital image is substantially blank; and
sending the first set of digital images for processing comprises sending the first set of digital images to be archived if the first digital image is not substantially blank.

8. A computer readable medium having instructions for:
causing a scan engine to initiate a scan of an ordered set of physical objects;
obtaining a first digital image of a first side of a physical object, the physical object being a first of the ordered set of physical objects, scanned by the scan engine;
examining the first digital image to determine if it is substantially blank;
if the first digital image is not substantially blank, obtaining a first set of digital images, each digital image of the first set being a digital image of a first side of a physical object of the ordered set of physical objects scanned by the scan engine, and sending the first set of digital images for processing by one of a print engine, a facsimile engine, an e-mail engine, and a file manager;
only if the first digital image is substantially blank, obtaining a second digital image of a second side of the physical object, the physical object being the first of the ordered set of physical objects scanned by the scan engine and examining the second digital image to determine if it is substantially blank; and
if the first digital image is substantially blank and the second image is not substantially blank, obtaining a second set of digital images, each digital image of the second set being a digital image of a second side of a physical object of the ordered set of physical objects scanned by the scan engine, and sending the second set of digital images for processing by one of the print engine, the facsimile engine, the e-mail engine, and the file manager.

9. The medium of claim 8, having further instructions for discarding the first digital image if it is substantially blank.

10. The medium of claim 8, wherein the instructions for obtaining the first and second sets of digital images include instructions for:
causing the scan engine to scan the first side of each physical object in the ordered set to generate the first set of digital images; and
causing the scan engine to scan the second side of each physical object in the ordered set to generate the second set of digital images.

11. The medium of claim 8, wherein the instructions for:
sending the second set of digital images for processing include instructions for sending the second set of digital images to be printed if the first digital image is substantially blank; and
sending the first set of digital images for processing include instructions for sending the first set of digital images to be printed if the first digital image is not substantially blank.

12. The medium of claim 8, wherein the instructions for:
sending the second set of digital images for processing include instructions for sending the second set of digital images to be incorporated in a facsimile transmission if the first digital image is substantially blank; and
sending the first set of digital images for processing include instructions for sending the first set of digital images to be incorporated in a facsimile transmission if the first digital image is not substantially blank.

13. The medium of claim 8, wherein the instructions for:
sending the second set of digital images for processing include instructions for sending the second set of digital images to be incorporated in an electronic mail message if the first digital image is substantially blank; and
sending the first set of digital images for processing include instructions for sending the first set of digital images to be incorporated in an electronic mail message if the first digital image is not substantially blank.

14. The medium of claim 8, wherein the instructions for sending the second set of digital images for processing include instructions for:
sending the second set of digital images to be archived if the first digital image is substantially blank; and
sending the first set of digital images for processing include instructions for sending the first set of digital images to be archived if the first digital image is not substantially blank.

15. A system for digital image selection, comprising a computer readable medium having instructions that when executed function as an image manager and a content module:
the image manager is operable to obtain a first digital image of a first side of a physical object and a second digital image of a second side of the physical object;
the content module is operable to examine the first digital image to determine if it is substantially blank and to examine the second digital image to determine if it is substantially blank and
wherein the image manager is further operable to send the second digital image for processing if the first digital image is substantially blank and to send the first digital image for processing if the first digital image is not substantially blank;
wherein the physical object is a first of an ordered set of physical objects and wherein the image manager is further operable to:
if the first digital image is determined to not be substantially blank by the content module, obtain a first set of digital images, each digital image of the first set being a digital image of a first side of a physical object of the ordered set of physical objects, and send the first set of digital images for processing;
only if the first digital image is substantially blank as determined by the content module, obtain a second digital image of a second side of the physical object, the physical object being the first of the ordered set of physical objects;
if the first digital image is substantially blank and the second image is not substantially blank as determined by the content module, obtain a second set of digital images, each digital image of the second set being a digital image of a second side of a physical object of the ordered set of physical objects, and send the second set of digital images for processing.

* * * * *

UNITED STATES PATENT AND TRADEMARK OFFICE
CERTIFICATE OF CORRECTION

| | |
|---|---|
| PATENT NO. | : 7,652,778 B2 |
| APPLICATION NO. | : 10/700215 |
| DATED | : January 26, 2010 |
| INVENTOR(S) | : Richard G. Sevier |

Page 1 of 1

It is certified that error appears in the above-identified patent and that said Letters Patent is hereby corrected as shown below:

In column 9, line 2, in Claim 7, after "images" delete "image".

In column 10, line 34, in Claim 15, delete "blank" and insert -- blank; --, therefor.

Signed and Sealed this

Thirty-first Day of August, 2010

David J. Kappos
*Director of the United States Patent and Trademark Office*